United States Patent
Lambricht et al.

(10) Patent No.: US 11,390,557 B2
(45) Date of Patent: Jul. 19, 2022

(54) GLASS FOR AUTONOMOUS CAR

(71) Applicant: AGC GLASS EUROPE, Louvain-la-Neuve (BE)

(72) Inventors: Thomas Lambricht, Perwez (BE); Yannick Sartenaer, Vedrin (BE); Quentin Fraselle, Mont Saint Guibert (BE); Nicolas Chorine, Haasrode (BE); Maxime Collignon, Gottignies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 165 days.

(21) Appl. No.: 16/497,230

(22) PCT Filed: Mar. 29, 2018

(86) PCT No.: PCT/EP2018/058183
§ 371 (c)(1),
(2) Date: Sep. 24, 2019

(87) PCT Pub. No.: WO2018/178284
PCT Pub. Date: Oct. 4, 2018

(65) Prior Publication Data
US 2020/0109081 A1   Apr. 9, 2020

(30) Foreign Application Priority Data
Mar. 30, 2017 (EP) ..................... 17163903

(51) Int. Cl.
*C03C 4/10* (2006.01)
*C03C 4/00* (2006.01)
*G01S 17/93* (2020.01)
*G01S 7/481* (2006.01)
*B32B 17/06* (2006.01)
*B32B 17/10* (2006.01)
*C03C 17/36* (2006.01)
*G01S 17/931* (2020.01)
*B60J 1/00* (2006.01)

(52) U.S. Cl.
CPC .......... *C03C 4/10* (2013.01); *B32B 17/10036* (2013.01); *B32B 17/10119* (2013.01); *B32B 17/10633* (2013.01); *B32B 17/10761* (2013.01); *B60J 1/00* (2013.01); *C03C 4/0092* (2013.01); *C03C 17/3644* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 4,973,511 A * | 11/1990 | Farmer | B32B 27/36 428/216 |
| 6,838,181 B1 | 1/2005 | Degand | |
| 2009/0295181 A1 | 12/2009 | Lawlor et al. | |
| 2010/0189996 A1 * | 7/2010 | Torr | B32B 17/10348 428/332 |
| 2011/0199674 A1 * | 8/2011 | Melcher | B32B 17/10761 359/359 |
| 2012/0310519 A1 | 12/2012 | Lawlor et al. | |
| 2013/0059137 A1 | 3/2013 | Hevesi et al. | |
| 2014/0017472 A1 | 1/2014 | Coster et al. | |
| 2014/0293267 A1 | 10/2014 | Itao et al. | |
| 2015/0192677 A1 | 7/2015 | Yu et al. | |
| 2015/0329063 A1 | 11/2015 | Lawlor et al. | |
| 2016/0002094 A1 | 1/2016 | Lambricht et al. | |
| 2016/0018949 A1 | 1/2016 | Lambricht et al. | |
| 2016/0137850 A1 * | 5/2016 | Ridealgh | C08K 3/22 428/195.1 |
| 2016/0194241 A1 | 7/2016 | Lambricht et al. | |
| 2016/0214887 A1 * | 7/2016 | Illy | C03C 17/2456 |
| 2016/0304389 A1 | 10/2016 | Dogimont et al. | |
| 2017/0190151 A1 * | 7/2017 | Hamano | B32B 17/06 |
| 2018/0141858 A1 * | 5/2018 | Kharchenko | C03C 23/0025 |
| 2019/0022984 A1 * | 1/2019 | Labrot | B32B 17/10201 |
| 2019/0091971 A1 * | 3/2019 | Klein | B32B 17/10293 |
| 2019/0359518 A1 * | 11/2019 | Lambright | C03C 3/095 |

FOREIGN PATENT DOCUMENTS

| | | |
|---|---|---|
| EP | 1 216 147 B1 | 8/2008 |
| EP | 2 784 542 A1 | 10/2014 |
| EP | 1 827 908 B1 | 4/2015 |
| WO | WO 2008/149093 A1 | 12/2008 |
| WO | WO 2011/147875 A1 | 12/2011 |
| WO | WO 2014/128016 A1 | 8/2014 |
| WO | WO 2014/146939 A1 | 9/2014 |
| WO | WO 2015/011042 A1 | 1/2015 |
| WO | WO 2015/091106 A1 | 6/2015 |
| WO | WO 2016/202689 A1 | 12/2016 |

OTHER PUBLICATIONS

Samman et al. "Potential Use of Near, Mid and Far Infrared Laser Diodes in Automotive LIDAR Applications" Vehicular Technology Conference Fall 2000. IEEE VTS Fall VTC2000. 52nd Vehicular Technology Conference (Cat. No. 00CH37152). (Year: 2000).*
Osram Opto Semiconductors, "Low-cost LIDAR—a key technology to enable autonomous driving in urban environments" (Year: 2015).*
International Search Report dated May 14, 2018 in PCT/EP2018/058183 filed Mar. 29, 2018.
Ohn-Bar, E. et al., "On surveillance for safety critical events: In-vehicle video networks for predictive driver assistance systems," Computer Vision and Image Understanding, vol. 134, 2015, pp. 130-140 (XP029124761).

* cited by examiner

*Primary Examiner* — David Sample
(74) *Attorney, Agent, or Firm* — Oblon, McClelland, Maier & Neustadt, L.L.P.

(57) ABSTRACT

The invention concerns an automotive glazing comprising (i) at least one glass sheet having an absorption coefficient comprised between 5 $m^{-1}$ and 15 $m^{-1}$ in the wavelength range from 750 to 1650 nm and having an external face and an internal face, and (ii) an infrared filter. According to the present invention, an infrared-based remote sensing device in the wavelength range from 750 to 1650 nm, and preferably in the wavelength range from 750 to 1000 nm, is placed on the internal face of the glass sheet in a zone free of the infrared filter layer.

20 Claims, No Drawings

GLASS FOR AUTONOMOUS CAR

The invention concerns a glass comprising an infrared-based remote sensing device and particularly a LiDAR sensor. More particularly, the invention concerns a glass comprising new generation LiDAR sensors to be integrated in an autonomous car.

Today, the tendency is to use more and more autonomous car to be completely used in the future. For example, futuristic autonomous car, also called driver less car, self-driving car, robotic car, is a vehicle that is capable of sensing its environment and navigating without human input.

Autonomous vehicles detect surroundings using radar, LiDAR (acronym of Light Detection And Ranging), GPS, Odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination.

Today, autonomous cars comprise "mushrooms-like" LiDAR sensors popping up all along the car metal body. Those "mushrooms" are for example placed on the roof or on car external rear view mirrors. In addition to being unaesthetic, they are imposing and take up much space which is not in line with the expectation of car designers preparing future car design with very smooth and curvy line which are incompatible with outside sensors. LiDAR sensors may be also embedded into the bumpers or headlight systems which implies other drawbacks such a higher exposure to damage and external climatic conditions.

It is also known windshield with integrated LiDAR. However, the new generation of LiDAR are more demanding in terms of optical properties and are therefore not fully compatible with conventional windshield configurations. In particular, since athermic glass or coated glasses and particularly coated windshield are more and more used by car manufacturer for thermal comfort reasons.

It is also known that integration of sensor behind the upper part of the windshield involves other advantages such as a good position for geometrical distance estimation, a better view on the road surface and a good overview on traffic situation. In addition, this locations also offers a recurrent aperture cleaning by the wipers, a low risk for stone scratches, a seamless aesthetic and more generally a better controlled environment to operate the sensor. Thus, there is a need for an alternative to the use of imposing and unaesthetic LiDAR sensors such as "mushrooms" for autonomous cars or LiDAR integrated in other sensitive locations such as the bumpers or headlight systems.

According to the present invention, the infrared-based remote sensing device LiDAR sensors are new generation LIDAR based on scanning, rotating, flashing or solid state LiDARs and enabling 3D mapping the surroundings around the vehicle. Thus, the IR based sensor allows to make precise mapping of the surrounding of the vehicle which is used to drive correctly the autonomous car and to prevent any shock with an obstacle.

LiDAR (also written Lidar, LIDAR or LADAR) is a technology that measures distance by illuminating a target with an infrared (IR) laser light. They are particularly scanning, rotating, flashing or solid state LiDARs. The scanning or rotating LiDARS are using moving lasers beams while flashing and solid state LiDAR emits light pulses which reflect off objects.

Thus, solutions from prior art can not reply to requirement for LiDAR new generation particularly because glass with integrated LiDAR was not considered as a possible solution.

Currently, there is no solution which allows IR signal to go through either the car body or glass parts such as windshield or backlite of a car with enough intensity.

Thus, the present invention proposes a solution wherein a LiDAR new generation sensor may integrated inside the autonomous car combing high detection range, minimal design change and higher safety.

This solution is possible by dint of integration of a LiDAR sensor on a windshield or an automotive glazing that exhibits a sufficient IR transmission for the sensor to operate properly.

For simplicity, the numbering of the glass sheets in the following description refers to the numbering nomenclature conventionally used for glazing. Thus, the face of the glazing in contact with the environment outside the vehicle is known as the side 1 and the surface in contact with the internal medium, that is to say the passenger compartment, is called face 2. For a laminated glazing, the glass sheet in contact with the outside environment the vehicle is known as the side 1 and the surface in contact with the internal part, namely the passenger compartment, is called face 4.

For avoidance of doubt, the terms "external" and "internal" refer to the orientation of the glazing during installation as glazing in a vehicle.

Also for avoidance of doubt, the present invention is applicable for all means of transport such as automotive, train, plane . . . but also other vehicles like drones, . . . .

Thus, the present invention concerns an automotive glazing comprising:
  a. at least one glass sheet having an absorption coefficient comprised between 5 m$^{-1}$ and 15 m$^{-1}$ in the wavelength range from 750 to 1650 nm and having an external face and an internal face,
  b. an infrared filter.

According to this present invention, an infrared-based remote sensing device operating in the wavelength range from 750 to 1650 nm is placed on the internal face of the glass sheet in a zone free of the infrared filter.

According to the invention, the glass sheet has an absorption coefficient comprised between 5 m$^{-1}$ and 15 m$^{-1}$ in the wavelength range from 750 to 1650 nm. To quantify the low absorption of the glass sheet in the infrared range, in the present description, the absorption coefficient is used in the wavelength range from 750 to 1650 nm. The absorption coefficient is defined by the ratio between the absorbance and the optical path length traversed by electromagnetic radiation in a given environment. It is expressed in m$^{-1}$. It is therefore independent of the thickness of the material but it is function of the wavelength of the absorbed radiation and the chemical nature of the material.

In the case of glass, the absorption coefficient ($\mu$) at a chosen wavelength $\lambda$ can be calculated from a measurement in transmission (T) as well as the refractive index n of the material (thick=thickness), the values of n, $\rho$ and T being a function of the chosen wavelength $\lambda$:

$$\mu = -\frac{1}{\text{thick}} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

with $\rho = (n-1)^2/(n+1)^2$.

The glass sheet according to the invention preferably has an absorption coefficient in the wavelength range of 750-1650 nm, generally used in optical technologies relating to the invention, very low compared to conventional glasses. In particular, the glass sheet according to the invention has an absorption coefficient in the wavelength range from 750 to 1650 nm comprised between 5 m$^{-1}$ and 15 m$^{-1}$.

Preferably, the glass sheet has an absorption coefficient in the wavelength range from 750 to 1650 nm between 5 m$^{-1}$ and 10 m$^{-1}$.

According to a preferred embodiment of the present invention, the glass sheet has an absorption coefficient in the wavelength range of 750 to 1000 nm comprised between 5 m$^{-1}$ and 15 m$^{-1}$.

A low absorption presents an additional advantage that the final IR transmission is less impacted by the optical path in the material. It means that for large field of view (FOV) sensors with high aperture angles the intensity perceived at the various angles (in different areas are the image) will be more uniform, especially when the sensor is optically coupled to the glazing.

Thus, when an autonomous vehicle encounters an unexpected driving environment unsuitable for autonomous operation, such as road construction or an obstruction, vehicle sensors through the glazing according to the invention can capture data about the vehicle and the unexpected driving environment. The captured data can be sent to a remote operator or to the central intelligence unit. The remote operator or unit can operate the vehicle or issue commands to the autonomous vehicle to be executed on various vehicle systems. The captured data sent to the remote operator/unit can be optimized to conserve bandwidth, such as by sending a limited subset of the captured data.

According to the invention, the glass sheet is made of glass which may belong to different categories with the particularity of having an absorption coefficient comprised between 5 m$^{-1}$ and 15 m$^{-1}$ in the wavelength range from 750 to 1650 nm. The glass can thus be a soda-lime-silica type glass, alumino-silicate, boro-silicate, . . . .

Preferably, the glass sheet having a high level of near infrared radiation transmission is an extra-clear glass.

Preferably, the base glass composition of the invention comprises a total content expressed in weight percentages of glass:

| | |
|---|---|
| SiO$_2$ | 55-85% |
| Al$_2$O$_3$ | 0-30% |
| B$_2$O$_3$ | 0-20% |
| Na$_2$O | 0-25% |
| CaO | 0-20% |
| MgO | 0-15% |
| K$_2$O | 0-20% |
| BaO | 0-20%. |

More preferably, the base glass composition comprises according to the invention in a content, expressed as total weight of glass percentages:

| | |
|---|---|
| SiO$_2$ | 55-78% |
| Al$_2$O$_3$ | 0-18% |
| B$_2$O$_3$ | 0-18% |
| Na$_2$O | 0-20% |
| CaO | 0-15% |
| MgO | 0-10% |
| K$_2$O | 0-10% |
| BaO | 0-5% |

More preferably, for reasons of lower production costs, the at least one glass sheet according to the invention is made of soda-lime glass. Advantageously, according to this embodiment, the base glass composition comprises a content, expressed as the total weight of glass percentages:

| | |
|---|---|
| SiO$_2$ | 60-75% |
| Al$_2$O$_3$ | 0-6% |
| B$_2$O$_3$ | 0-4% |
| CaO | 0-15% |
| MgO | 0-10% |
| Na$_2$O | 5-20% |
| K$_2$O | 0-10% |
| BaO | 0-5%. |

In addition to its basic composition, the glass may include other components, nature and adapted according to quantity of the desired effect.

A solution proposed in the invention to obtain a very transparent glass in the high infrared (IR), with weak or no impact on its aesthetic or its color, is to combine in the glass composition a low iron quantity and chromium in a range of specific contents.

Thus, according to a first embodiment, the glass sheet preferably has a composition which comprises a content, expressed as the total weight of glass percentages:

| | |
|---|---|
| Fe total (expressed asFe$_2$O$_3$) | 0.002-0.06% |
| Cr$_2$O$_3$ | 0.0001-0.06%. |

Such glass compositions combining low levels of iron and chromium showed particularly good performance in terms of infrared reflection and show a high transparency in the visible and a little marked tint, near a glass called "extra-clear". These compositions are described in international applications WO2014128016A1, WO2014180679A1, WO2015011040A1, WO2015011041A1, WO2015011042A1, WO2015011043A1 and WO2015011044A1, incorporated by reference in the present application. According to this first particular embodiment, the composition preferably comprises a chromium content (expressed as Cr2O3) from 0.002 to 0.06% by weight relative to the total weight of the glass. Such contents of chromium it possible to further improve the infrared reflection.

According to a second embodiment, the glass sheet has a composition which comprises a content, expressed as the total weight of glass percentages:

| | |
|---|---|
| Fe total (expressed as Fe$_2$O$_3$) | 0.002-0.06% |
| Cr$_2$O$_3$ | 0.0015-1% |
| Co | 0.0001-1%. |

Such chromium and cobalt based glass compositions showed particularly good performance in terms of infrared reflection while offering interesting possibilities in terms of aesthetics/color (bluish neutrality to intense coloration even up opacity). Such compositions are described in European patent application No. 13 198 454.4, incorporated by reference herein.

According to a third embodiment, the glass sheets have a composition which comprises a content, expressed as the total weight of glass percentages:

| total iron (expressed as $Fe_2O_3$) | 0.02-1% |
|---|---|
| $Cr_2O_3$ | 0.002-0.5% |
| Co | 0.0001-0.5%. |

Preferably, according to this embodiment, the composition comprises: 0.06%<Total Iron≤1%.

Such compositions based on chromium and cobalt are used to obtain colored glass sheets in the blue-green range, comparable in terms of color and light transmission with blue and green glasses on the market, but with performances particularly good in terms of infrared reflection. Such compositions are described in European patent application EP15172780.7, and incorporated by reference into the present application.

According to a fourth embodiment, the glass sheet has a composition which comprises a content, expressed as the total weight of glass percentages:

| total iron (expressed as $Fe_2O_3$) | 0.002-1% |
|---|---|
| $Cr_2O_3$ | 0.001-0.5% |
| Co | 0.0001-0.5%. |
| Se | 0.0003-0.5%. |

Such glass compositions based on chromium, cobalt and selenium have shown particularly good performance in terms of infrared reflection, while offering interesting possibilities in terms of aesthetics/color (gray neutral to slight staining intense in the gray-bronze range). Such compositions are described in the application of European patent EP15172779.9, and incorporated by reference into the present application.

According to a first alternative embodiment, the glass sheet has a composition which comprises a content, expressed as the total weight of glass percentages:

| total iron (expressed as $Fe_2O_3$) | 0.002-0.06% |
|---|---|
| $CeO_2$ | 0.001-1%. |

Such compositions are described in European patent application No. 13 193 345.9, incorporated by reference herein.

According to another alternative embodiment, the glass has a composition which comprises a content, expressed as the total weight of glass percentages:
total iron (expressed as $Fe_2O_3$) 0.002-0.06%;
and one of the following components:
manganese (calculated as MnO) in an amount ranging from 0.01 to 1% by weight;
antimony (expressed as $Sb_2O_3$), in an amount ranging from 0.01 to 1% by weight;
arsenic (expressed as $As_2O_3$), in an amount ranging from 0.01 to 1% by weight, or
copper (expressed as CuO), in an amount ranging from 0.0002 to 0.1% by weight.

Such compositions are described in European patent application No. 14 167 942.3, incorporated by reference herein.

According to the present invention, the automotive glazing may be in the form of planar sheets. The glazing may be curved. This is usually the case for automotive glazing as for rear windows, side windows or roofs or especially windshields.

In automotive applications, the presence of high transmission glass sheet in the infrared is not conducive for maintaining thermal comfort when the vehicle is exposed to sunlight. A proposed means of the invention is to provide a glazing with a high selectivity (TL/TE), preferably with a selectivity greater than 1 or greater than 1.3. Thus, to remain under appropriate conditions of energy transmission and thermal comfort, apart from the already specified elements, the glazing according to the invention comprises means to selectively filtering the infrared from sun radiation.

Alternatively, it may be advantageous to use in combination with the glass according to the invention, a filtering layer having an IR transmission lower than 50, 40, 35, 30, 25, 20, 15, 10, 5, 4, 3, 2 or 1%.

Advantageously, the infrared filter is a reflective layer with a multilayer stack comprising n-layer (s) functional (s) based on a material that reflects infrared radiation, with n≥1, and n+1 dielectric coatings such that each functional layer is surrounded by dielectric coatings.

The functional layers, part of the infrared reflecting layers are advantageously formed from noble metal. They can be based on silver, gold, palladium, platinum or their mixture or alloy, but also based on copper or aluminum, alone, alloy or alloy with one or more noble metals. Preferably all the functional layers are based on silver. It is a noble metal that has a very high efficiency of reflection of infrared radiation. It is easily implemented in a magnetron device and its cost is not prohibitive, especially with regard to its effectiveness. Advantageously, the silver is doped with a few percent palladium, aluminum or copper, for example because of 1 to 10% by mass, or can be used a silver alloy.

Dielectrics, transparent coatings, part of infrared reflective layers are well known in the field of films deposited by sputtering. Suitable materials are many and it is not useful to make the full list here. These are generally oxides, oxynitrides or metal nitrides. Among the most common include for example SiO2, $TiO_2$, $SnO_2$, ZnO, ZnAlOx, $Si_3N_4$, AlN, $Al_2O_3$, $ZrO_2$, $Nb_2O_5$, $YO_x$, $TiZrYO_x$, $TiNbO_x$, $HfO_x$, MgOx, $TaO_x$, CrOx and $Bi_2O_3$, and mixtures thereof. One can also cite the following materials: AZO, ZTO, GZO, $NiCrO_x$, TXO, ZSO, TZO, TNO TZSO, TZAO and TZAYO. The term AZO relates to a zinc oxide doped with aluminum or a mixed oxide of zinc and aluminum, obtained preferably from a ceramic target formed by the oxide to be deposited, sprayed either neutral or slightly oxidizing atmosphere. Similarly, the ZTO or GZO expressions relate respectively to mixed oxides of titanium and zinc or zinc and gallium, obtained from ceramic targets, either in a neutral or slightly oxidizing atmosphere. The term TXO relates to titanium oxide obtained from a titanium oxide ceramic target. The ZSO term refers to a mixed zinc-tin oxide obtained either from a metal target of alloy deposited in an oxidizing atmosphere or from a ceramic target of the corresponding oxide or neutral atmosphere or slightly oxidizing. TZO TNO TZSO, TZAO or TZAYO expressions relate respectively to mixed titanium zirconium oxides, titanium-niobium, titanium-zirconium-tin, titanium-zirconium-aluminum or titanium-zirconium-aluminum-yttrium, obtained from ceramic targets, either neutral or slightly oxidizing atmosphere. All these above mentioned materials can be used to form the dielectric films used in the present invention.

Preferably, the dielectric coating disposed under one or each functional layer includes, in direct contact with the functional layer or layers, a layer based on zinc oxide, optionally doped for example with aluminum or gallium, or alloy with tin oxide. The zinc oxide can have a particularly favorable effect on the stability and the corrosion resistance of the functional layer, especially when it comes to money. It is also conducive to the improvement of the electrical conductivity of a silver-based layer, and thus obtaining a low emissivity.

The different layers of the stack are, for example, sputtered under reduced pressure magnetron sputtering, in a known magnetron device. The present invention is however not limited to this particular method of layer deposition.

According to a particular embodiment of the invention, these layers of assemblies may be arranged either on a carrier sheet, in particular of PET, inserted in the laminated, either by direct application on the glass sheet.

As an alternative to metal layers on the basis described above, the infrared reflective layer can include a plurality of non-metallic layers, so that it operates as a band pass filter (the band being centered near the region infrared electromagnetic spectrum).

According to a preferred embodiment of the invention, the automotive glazing is a laminated glazing comprising an exterior and an interior glass sheets laminated with at least one thermoplastic interlayer and wherein the exterior and an interior glass sheets are high level of near infrared radiation transmission glass sheets having an absorption coefficient comprised between 5 $m^{-1}$ and 15 $m^{-1}$ in the wavelength range from 750 to 1650 nm and preferably from 750 to 1000 nm. The layer reflecting infrared radiation is then preferably placed on face 2 meaning on the inner face of the first glass sheet which is mounted on the vehicle and being in contact with the external environment.

According to another embodiment of the present invention, the infrared filter is a thermoplastic interlayer absorbing infrared rays. Such thermoplastic interlayer is for example a PVB doped with an ITO.

According to another embodiment of the present invention, the infrared filter is a tinted glass.

According to one embodiment of the present invention, the glass sheet has a value of light transmission lower than the value of infrared transmission. Particularly, according to another embodiment of the present invention, the value of light transmission in the visible range is lower than 10% and the value of near infrared transmission is higher than 50%.

According to another advantageous embodiment of the invention, the glass sheet is covered with at least one IR transparent absorbing (tinted) and/or reflecting coating in order to hide the un-aesthetic element of the sensor from the outside while ensuring a good level of operating performances. This coating may, for example, be composed of at least one layer of black ink having no (or very low) transmission in the visible optical range but having a high transparency in the infrared range of interest for the application. Such ink can be made of organic compounds as, for example, commercial products manufactured by Seiko Advance Ltd. Or Teikoku Printing Ink Mfg. Co. Ltd. that can achieve transmission<5% in the 400-750 nm range and >70% in the 850-1650 nm range. The coating may be provided on face(s) 1 or/and 2 for a single automotive glazing element or on face(s) 1 or/and 4 for a laminated automotive glazing, depending of its durability.

According to another embodiment of the invention, the glass sheet may be covered with a multilayer coating optimized to reflect selectively the visible range while maintaining high IR transmission. Some properties such as observed on Kromatix® product are thus sought. These properties ensure a total low IR absorbance of the complete system when such layer is deposited on adequate glass composition. The coating may be provided on face(s) 1 or/and 2 for a single automotive glazing element or on face(s) 1 or/and 4 for a laminated automotive glazing, depending of its durability.

According to the present invention, a LiDAR instrument is an optoelectronic system composed of at least a laser transmitter, at least a receiver comprising a light collector (telescope or other optics) and at least a photodetector which converts the light into an electrical signal and an electronic processing chain signal that extracts the information sought.

The LiDAR is placed on the internal face of the glass sheet (namely face 2) in case of one glass sheet glazing in a zone free of infrared filter layer.

Preferably, the LiDAR is placed in the upper part of the glazing and more preferably closed to the mirror holder.

According to another embodiment of the present invention, the automotive glazing is a laminated glazing wherein the LiDAR is placed on the internal face of the inner glass sheet namely the face 4 on a zone of the glass sheet wherein the IR-filtering mean is not present.

According to a preferred embodiment of the present invention, the automotive glazing is a windshield. Thus, the infrared-based remote sensing device is placed on face 4 of the windshield on a zone free of infrared reflective layer. Indeed, in case of an infrared reflective coating, a zone free of coating is provided for example by decoating or by masking in a way that the LiDAR is positioned on this area without coating on face 4 (or on face 2 in case of one glass sheet glazing) to insure its functionalities. The coating free area has generally the shape and dimensions of the infrared-based remote sensing device. In case of an infrared absorbing film, the film is cut in the dimensions of the LiDAR that the LiDAR is positioned on this area without film to insure its functionalities.

According to one embodiment of the present invention, the automotive glazing is ultrathin glazing.

Advantageously, the IR-based remote sensing device is optically coupled to the internal face of the glazing. For example, a soft material that fits refractive index of the glass and the external lens of the LiDAR may be used.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. Such coating may be provided on face(s) 1 or/and 2 for a single glazing" or on face(s) 1 or/and 4 for a laminated glazing. A textured glass sheet may be also used. Etching or coating techniques may as well be used in order to avoid reflection.

The invention claimed is:
1. A glazing comprising:
a glass sheet having an absorption coefficient comprised between 5 $m^{-1}$ and 15 $m^{-1}$ in a wavelength range from 750 to 1650 nm and having an external face and an internal face, and
an infrared filter,
wherein an infrared-based remote sensing device in the wavelength range from 750 to 1650 nm is placed on the internal face of the glass sheet in a zone free of the infrared filter layer.

2. The glazing, according to claim 1 wherein the glass sheet has an absorption coefficient comprised between $5\ m^{-1}$ and $10\ m^{-1}$.

3. The glazing according to claim 1, wherein the infrared-based remote sensing device is optically coupled to the internal face of the glazing.

4. The glazing according to claim 1, wherein the glazing is a laminated glazing comprising the glass sheet, which is an exterior glass sheet, and an interior glass sheet laminated with at least one thermoplastic interlayer and wherein the exterior and an interior glass sheets are high level of near infrared radiation transmission glass sheets having an absorption coefficient comprised between $5\ m^{-1}$ and $15\ m^{-1}$ and wherein the infrared-based remote sensing device is placed on the internal face of the inner glass sheet.

5. The glazing according to claim 1, wherein a value of light transmission of the glass sheet is lower than a value of near infrared transmission.

6. The glazing according to claim 1, wherein the glass sheet is covered with at least one near-infrared transparent coating that absorbs and/or reflects a visible light.

7. The glazing according to claim 1, wherein the glass sheet comprises a content, expressed as the total weight of glass percentages:
total iron (expressed as $Fe_2O_3$) 0.002 to 0.06%; and
$Cr_2O_3$ 0.0001 to 0.06%.

8. The glazing according to claim 1, wherein the glass sheet comprises a content, expressed as the total weight of glass percentages:
total iron (expressed as $Fe_2O_3$) 0.002 to 0.06%;
$Cr_2O_3$ 0.0015 to 1%; and
$C_O$ 0.0001 to 1%.

9. The glazing according to claim 1, wherein the glass sheet comprises a content, expressed as the total weight of lass percentages:
total iron (expressed as $Fe_2O_3$) 0.02 to 1%;
$Cr_2O_3$ 0.002 to 0.5%; and
$C_O$ 0.0001 to 0.5%.

10. The glazing according to claim 1, wherein the glass sheet comprises a content, expressed as the total weight of glass percentages:
total iron (expressed as $Fe_2O_3$) from 0.002 to 1%;
$Cr_2O_3$ 0.001 to 0.5%;
$C_O$ 0.0001 to 0.5%; and
Se 0.0003 to 0,5%.

11. The glazing according to claim 1, wherein the infrared filter is a multilayer stack comprising n- functional (s) layer (s) of a material reflecting infrared radiation, with $n \geq 1$, and n+1 dielectric coatings such that each functional layer is surrounded by dielectric coatings.

12. The glazing according to claim 1, wherein the infrared filter is silver-based.

13. The glazing according to claim 1, wherein the infrared filter is a coating wherein the zone free of the infrared filter is provided on which an infrared-based remote sensing device is placed.

14. The glazing according to claim 1, wherein the infrared-based remote sensing device is a LIDAR system based on scanning, rotating, flashing or solid state LiDARs and enabling of 3D mapping the surroundings around the vehicle.

15. The glazing according to claim 1, wherein an anti-reflective coating is provided on a surface of the automotive glazing.

16. The glazing according to claim 1, wherein the glazing is a windshield.

17. The automotive glazing according to claim 1, wherein the infrared filter comprises a coating deposited on the glass sheet.

18. The automotive glazing according to claim 1, further comprising a second glass sheet laminated to the glass sheet with at least one thermoplastic interlayer, wherein the second glass sheet has an absorption coefficient between $5\ m^{-1}$ and $15\ m^{-1}$.

19. An automotive glazing comprising:
a. a first glass sheet having an absorption coefficient between $5\ m^{-1}$ and $15\ m^{-1}$ in a wavelength range from 750 nm to 1650 nm,
b. an infrared filter,
c. a thermoplastic interlayer,
d. a second glass sheet having an absorption coefficient lower than $5\ m^{-1}$ in the wavelength range from 1051 nm to 1650 nm, and
e. an infrared-based remote sensing device in the wavelength range from 1051 nm to 1650 nm placed on face 4 of the second glass sheet in a zone free of the infrared filter,
wherein the first glass sheet, the second glass sheet, and the thermoplastic interlayer are laminated together.

20. The glazing according to claim 19, wherein the first glass sheet has an absorption coefficient between $5\ m^{-1}$ and $10\ m^{-1}$.

* * * * *